US010343944B2

(12) United States Patent
Jones et al.

(10) Patent No.: US 10,343,944 B2
(45) Date of Patent: Jul. 9, 2019

(54) GLASS STRUCTURE HAVING 3D SHAPE AND UNIFORM THICKNESS

(71) Applicant: Apple Inc., Cupertino, CA (US)

(72) Inventors: Christopher D. Jones, Los Gatos, CA (US); Dale N. Memering, San Francisco, CA (US); Christopher D. Prest, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 192 days.

(21) Appl. No.: 15/269,838

(22) Filed: Sep. 19, 2016

(65) Prior Publication Data

US 2017/0081238 A1 Mar. 23, 2017

Related U.S. Application Data

(60) Provisional application No. 62/221,255, filed on Sep. 21, 2015.

(51) Int. Cl.
*C03B 23/03* (2006.01)
*C03B 23/025* (2006.01)
*C03B 23/023* (2006.01)
*C03B 32/02* (2006.01)

(52) U.S. Cl.
CPC ...... *C03B 23/0302* (2013.01); *C03B 23/0235* (2013.01); *C03B 23/0258* (2013.01); *C03B 23/0307* (2013.01); *C03B 32/02* (2013.01)

(58) Field of Classification Search
CPC . C03B 27/0404; C03B 27/044; C03B 27/052; C03B 29/16; C03B 23/0258; C03B 23/03; C03B 23/0302; C03B 23/0307; C03B 17/067; C03B 23/023; C03B 23/02; C03B 23/0256; C03B 23/0305
See application file for complete search history.

(56) References Cited

U.S. PATENT DOCUMENTS

| 6,758,064 | B1 * | 7/2004 | Kariya | C03B 17/06 65/118 |
| 8,196,431 | B2 * | 6/2012 | Burdette | G05D 5/03 65/29.12 |
| 9,233,869 | B2 * | 1/2016 | Pitbladdo | C03B 17/064 |

* cited by examiner

*Primary Examiner* — Jodi C Franklin
(74) *Attorney, Agent, or Firm* — Brownstein Hyatt Farber Schreck, LLP (57) ABSTRACT

A method of modifying a substrate formed of non-deformable material is disclosed. In some embodiments, techniques are disclosed for identifying a region of a planar substrate that is susceptible to stretching during a subsequent shaping operation. In some embodiments, techniques are disclosed for adding an amount of non-deformable material to the planar substrate at an identified location and in a single operation, acting on the substrate until the substrate has a shape corresponding to a uniform thickness and a three-dimensional curvature.

19 Claims, 9 Drawing Sheets

GLASS STRUCTURE HAVING 3D SHAPE AND UNIFORM THICKNESS

CROSS-REFERENCE TO RELATED APPLICATION

This application claims the benefit of U.S. Provisional Application No. 62/221,255, entitled "GLASS STRUCTURE HAVING 3D SHAPE AND UNIFORM THICKNESS" filed on Sep. 21, 2015, which is incorporated by reference herein in its entirety.

FIELD

The following disclosure relates to glass structures having a shape with curves that extend to three-dimensions and methods of forming thereof.

BACKGROUND

It is standard practice to deform a sheet of glass while it is still very hot and somewhat plastic from a substantially two-dimensional planar shape into a more complex three-dimensional shape. However, in order to have a finished product of acceptable quality and without defects that would cause the finished product to be weakened and form optical distortions, multiple post shaping operations, such as grinding to maintain uniform thickness, must be performed. Glass structures with a non-uniform thickness are associated with undesirable characteristics including optical distortions and reduced structural rigidity. While performing a post-shaping operation such as grinding can reduce the uneven thickness prevalent in conventionally formed curved glass structures, such post-shaping techniques are costly, time-consuming, and cannot sufficiently control the variation in thickness of the shaped glass substrate.

SUMMARY

The embodiments described herein set forth techniques for forming a curved substrate from a planar substrate.

In one aspect, method for shaping a part formed of non-deformable material into a final formed part having a three-dimensional shape and a uniform final thickness, is described. The method includes identifying a region of the part that is predicted to deviate from the uniform final thickness as a result of a shaping process, altering a geometry of the identified region in a manner that compensates for the predicted deviation, and shaping the part comprising the altered geometry using the shaping process that results in the final formed part having the three-dimensional shape and the uniform final thickness.

In another aspect, a method for identifying a region of a planar substrate that is susceptible to stretching during a shaping operation for forming a curved substrate, is described. The methods includes receiving at least one substrate characteristic of the region of the planar substrate, comparing the at least one substrate characteristic to at least one target characteristic of a corresponding region of a target substrate, where the target substrate has a shape of the curved substrate, and identifying that the region of the planar substrate is susceptible to stretching when the comparing indicates that a difference between the at least one substrate characteristic and the at least one target characteristic exceeds a threshold value.

In another aspect, a system including a processor and a memory containing instructions that, when executed by the processor, cause the system to perform the steps of receiving one or more characteristics of an initial substrate, comparing the one or more characteristics to one or more corresponding characteristics of a target substrate, based upon the comparing, identifying a region of the initial substrate that is susceptible to stretching during a shaping operation, and determining an amount of material to be added to the identified region to provide a compensated substrate that minimizes stretching during the shaping operation.

Other systems, methods, features and advantages of the embodiments will be, or will become apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an electronic device and in particular methods and apparatus that can be used to create a structure formed of non-deformable material having a three-dimensional curvature and a uniform thickness, which can form a part of the electronic device. In the following discussion and without loss of generality, the non-deformable material can be glass that can be used with the electronic device as a housing, cover glass, ornamental structure, and so on. A particularly salient point of this discussion is that formation of the structure requires but a single forming operation in order to achieve both the desired shape and uniformity of thickness. No post-forming steps (aside from finishing steps for polishing and so on) are required to assure the uniform thickness.

It should be noted that there are four common methods to form a 3D shape of glass from a sheet all of which involve heating glass near its softening point, then applying pressure or allowing gravity to shape the glass. The methods can be performed individually or in combination and include 1) slumping (or sag bending), where gravity force bends the sheet, 2) press molding, where the glass is pressed between a male mold and a female mold using active pressure, 3) pressure forming, where pressurized gas is used to push the glass sheet into a mold, or 4) vacuum forming, where a vacuum is used to pull the glass into the mold.

When forming a deformable surface, the thickness variation stays constant. However, when forming a non-deformable surface, the thickness of the glass sheet becomes thinner (or thicker, but uncommon), so that the formed part has a non-uniform thickness. The thinning of the part is determined by the temperature, geometry and pressure.

In general, glass structures having a uniform thickness do not suffer from optical distortions prevalent with glass structures having a non-uniform thickness. Moreover, glass structures with a uniform thickness are more structurally rigid and resistant to suffering stress fractures, especially in thin regions. When a sheet of glass is stretched into a larger shape or a curved shape, it can impart an increase in the surface area of the glass, but is associated with a corresponding reduction in the initial thickness of the sheet of glass. As a result, the formed glass structure can have a non-uniform thickness. Accordingly, glass may need to be further machined (or polished) to modify the thickness or geometry of the glass structure.

When a substrate formed of non-deformable material is formed to have a shape with a three-dimensional curvature, certain portions of the substrate can stretch resulting in the stretched portion having a reduced thickness compared to a remainder of the substrate. This variation in thickness can cause problems with the substrate formed of glass in that, the variation in thickness can result in optical aberrations. These optical aberrations can result in poor optical performance that can result in optical distortions that can adversely affect performance of an optical component, such as a lens. In order to mitigate the optical defects, a post molding machining operation is performed that reduces the variation in thickness to an acceptable amount.

In contrast, the embodiments described herein rely upon identifying prior to initiation of the molding operation, those portions of the substrate that are likely to undergo stretching during the molding operation. Once identified, the stretchable regions can be augmented with additional substrate material in an amount that compensates for the thinning expected during the molding operation. In this way, in a single operation, any thinning of the substrate can be compensated resulting in a curved substrate having a uniform thickness. Accordingly, machining of the substrate subsequent to the molding operation can be avoided thereby rendering the process more time-efficient. In addition, the process can reduce the amount of material used.

This paper describes embodiments that relate to modifying a glass sheet or substrate prior to forming of the three-dimensional shape to further control the thickness variation of the final part. In one embodiment, starting with a flat sheet, the thickness variation of the glass part is uniform. Forming different thicknesses, either using step change in thickness or a gradual change in thickness, can be based upon determining the desired geometry of the final part. Accordingly, forming different thicknesses enables different thickness uniformity in the final formed part than can be achieved by forming only the thin sheet. An additional benefit is that the parts may be further polished prior to shaping. This is beneficial because it is easier (less expensive, higher throughput, and uses more traditional polishing techniques) to polish flat parts than shaped parts.

In the following discussion and without loss of generality, the term "non-deformable" can refer to a non-transformative state of a material that is resistant to being misshapen or distorted. When a material is in a non-deformable state, upon the application of an elastic force to the material, the material is able to absorb some stress of the applied force up to a specified material threshold. However, when the material threshold is exceeded, the material can break. For example, hardened glass is a non-crystalline amorphous solid that can transition between a deformable and non-deformable state. During the non-deformable state, the application of an amount of force (beyond a material threshold) can cause the glass to crack. In contrast, while glass is in a deformable state, the application of force can cause the shape of the glass to distort or become misshapen.

The term "deformable" can refer to a material, which can readily be distorted subsequent to undergoing a deformation process. In some embodiments, application of force (deformation energy) can cause a deformable material to become distorted or misshapen. Examples of application of force include tensile (pulling) forces, compressive (pushing) forces, shearing, bending or torsion (twisting) forces. In other embodiments, a change in temperature can also cause a material to become deformed. Subsequently, a deformable material can be shaped to conform to a variety of different structures. In some embodiments, the deformable material can conform to a target shape, geometry, surface finish, material composition, and dimensions (e.g., width, thickness) of a target structure.

The embodiments shown and described relate to formation of a glass structure having a three-dimensional curvature and uniform thickness that is created in a single forming operation. The electronic device can take the form of a wearable electronic device that can be attached to a garment worn by a user or carried with respect to an appendage (such as a wrist) of the user. For example, the methods described herein can be used to form a durable layer for portions of computers, portable electronic devices and electronic device accessories, such as those manufactured by Apple Inc., based in Cupertino, Calif. These and other embodiments are discussed below with reference to FIGS. 1-8 of the Drawings. However, those skilled in the art will readily appreciate that the detailed description given herein with respect to these Drawings is for explanatory purposes only and should not be construed as limiting.

Figure 1:
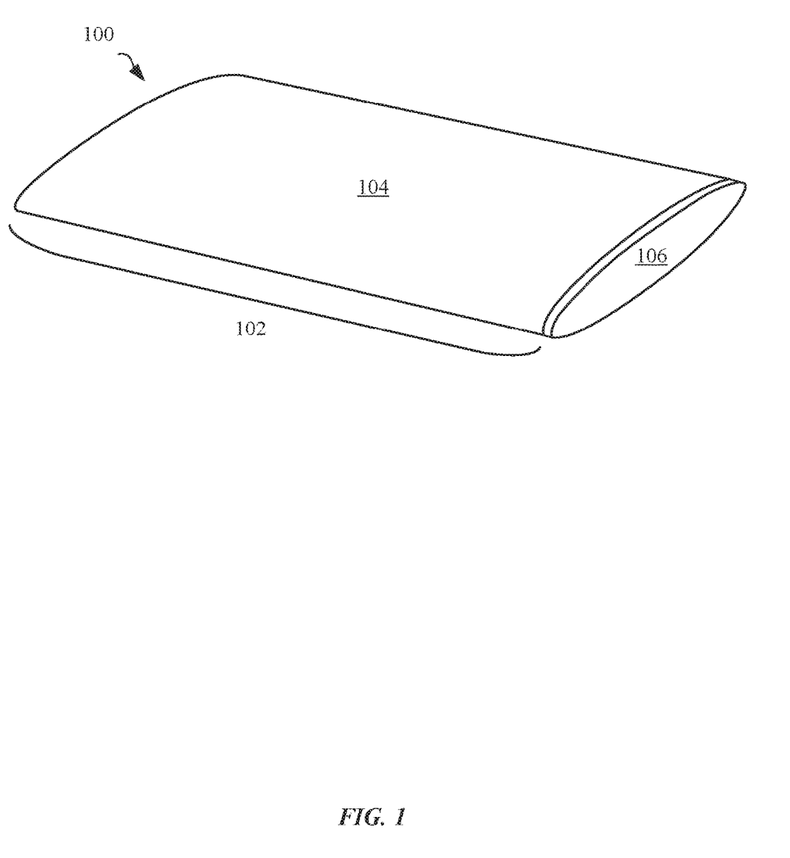
FIG. 1 illustrates a perspective view of a portable electronic device having a curved housing formed of non-deformable material, in accordance with some embodiments.

FIG. 1 shows a perspective view of portable electronic device 100 having housing 102. In the described embodiments, housing 102 can include curved body 104 that cooperates with end portion 106 defining an internal cavity suitable for carrying operational components such as a display assembly. It should be noted that curved body 104 can be formed of non-deformable material and shaped in a manner that accords with the described embodiments. The non-deformable material can be either opaque, translucent, transparent or any combination thereof. For example, the non-deformable material can be transparent to visible light and as such can be formed of optically clear glass. In order to provide a distortion free transmission medium, at least curved housing 102 can have a uniform thickness for any portion capable of passing visual content from, for example, the display assembly. Accordingly, portable electronic device 100 can function as a portable personal communication device, such as a smart phone, or other such device than can operate to provide visual content through at least curved housing 102 in any appropriate direction.

Glass substrates are often a choice material to provide both functional and aesthetic functionalities to consumer devices. In some embodiments, the glass substrates of consumer devices can be shaped to incorporate intricate and complex structures that can enhance the aesthetic look of a consumer device or increase the functionality of a consumer device. For example, a glass substrate can be shaped to have a three-dimensional curvature such as an ellipsoid. In some examples, a glass structure having an ellipsoid shape having a curved surface can provide a larger screen surface in a more compact package.

FIGS. 2A-2D illustrate various perspective views of techniques for adding substrate material to identified stretchable regions of an initial substrate 200 having a two-dimensional (i.e., flat) geometry for forming a shaped substrate 230.

Figure 2A:
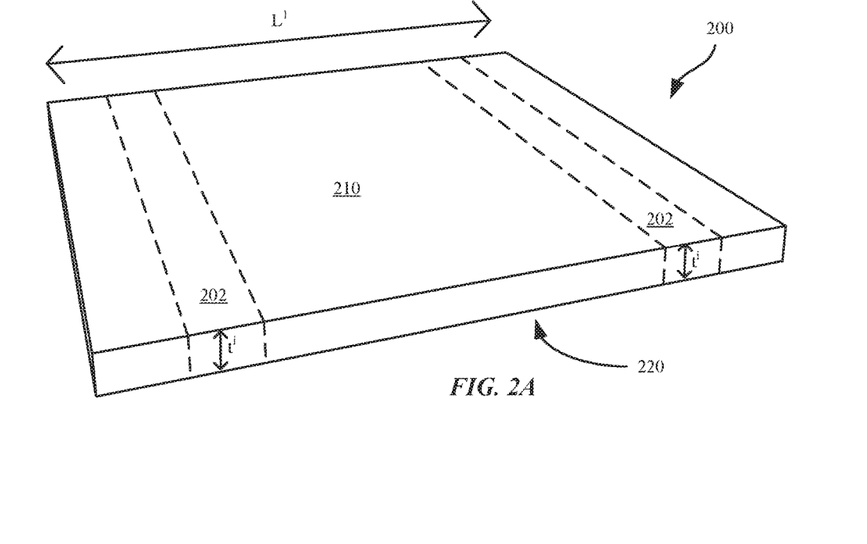
FIGS. 2A-2D illustrate various perspective views of techniques for adding substrate material to identified stretchable regions of a substrate, in accordance with some embodiments.

FIG. 2A illustrates that the initial substrate 200 can have a substantially flat geometry, according to some embodiments. The initial substrate 200 can have an initial thickness $t^i$, which can be sufficiently thick to allow for stretching the initial substrate 200 into a three-dimensional curvature without loss of structural integrity or rigidity when it is shaped. In some embodiments, the initial substrate 200 can have an initial thickness $t^i$ that is substantially uniform. In some embodiments, the initial substrate 200 can be formed of non-deformable material. In some embodiments, the initial substrate 200 can be formed of material (e.g., pure silica) that can transition between a deformable state and a non-deformable state upon a change in temperature or thermal energy. In some embodiments, the pure silica can refer to glass. In some embodiments, the initial substrate 200 can be referred to as an initial or unprocessed substrate. In some embodiments, the initial substrate 200, which undergo a shaping operation, can form a finished or shaped substrate 230 having a three-dimensional curvature.

FIG. 2A shows that the initial substrate 200 includes an upper surface 210 and a lower surface 220. Although FIG. 2A shows that the initial substrate 200 can have an initial thickness that can be substantially uniform throughout, in some embodiments, the initial substrate 200 can have curved geometry and/or a non-uniform initial thickness. FIG. 2A illustrates that the initial substrate 200 can have an initial length ($L^1$). The length of the initial substrate 200 can be increased during the shaping operation such that the final length ($L^2$) can be longer than the initial length ($L^1$).

In some embodiments, techniques can be performed to identify one or more regions 202 of the initial substrate 200 which are susceptible to stretching during a subsequent shaping operation. When the initial substrate 200 is shaped, the identified regions 202 can stretch at a greater rate than other regions of the initial substrate 200.

In some embodiments, identifying the regions susceptible to stretching can be performed by software running on a computing device. Details of the computing device (ref. 800, FIG. 8) will be described in more detail with reference to FIG. 8. In some embodiments, the software can compare the initial substrate 200 to a target substrate that has a three-dimensional curvature. Based upon the comparison, the software can determine the shaping parameters required to shape the initial substrate 200 to conform to the shape of the target substrate. The software can identify corresponding point(s) and/or region(s) between the initial substrate 200 and the target substrate to determine an amount of change required to conform the initial substrate to the target substrate. For example, the software can initially refer to a target point on the initial substrate 200 and obtain at least one of a distance or an angle from the target point to one or more adjacent points on the initial substrate 200. Subsequently, the software can refer to a corresponding target point on the target substrate and determine a change ($\Delta$) in the distance or angle from the corresponding target point to one or more adjacent points on the target substrate. Accordingly, based upon the amount of change required to be imparted to the initial substrate 200 to conform to the shape and size of the target substrate, the software can identify regions of the substrate susceptible to stretching. In addition, the program can determine the amount of additional non-deformable material to be added to the identified points and regions. Once identified, the stretchable regions can be augmented with additional substrate material in a relative amount that can compensate for the thinning expected during the shaping operation.

The software can compare the initial substrate 200 to a target substrate (e.g., provided by a computer-assisted design model). The target substrate can have target geometry, shape, curvature, and dimensions. In one example, the initial substrate 200 can have a uniform initial thickness ($t^i$) of 50 micrometers. Based upon the comparison, the program can determine that identified regions 202 of the initial substrate 200 will stretch such that the thickness in the identified regions 202 will reduce (or become thinner) by 10 micrometers. Thus, the software can determine that 10 micrometers should be added to the identified region 202 to compensate for expected reduction in thickness in order to form a shaped substrate 230 having a substantially uniform thickness ($t^u$). In some examples, other regions of the initial substrate 200 may be unaffected (e.g., stretched) by the subsequent shaping operation. In some examples, other regions of the initial substrate 200 can be experience some stretching but at such a minimal amount that additional substrate material is not required to be added to these other regions. In some embodiments, the program can identify point(s) and/or region(s) of the initial substrate 200 which are most susceptible to stretching. Accordingly, the program can determine the amount of additional non-deformable material to be added to the identified points and regions in order to form a target substrate having a uniform thickness.

In some embodiments, the program can be configured to assign material characteristics to the initial substrate 200 in identifying one or more point(s) and/or region(s) of the initial substrate 200 that are susceptible to stretching during a shaping operation. For example, the material characteristics can refer to a shape, a size, a geometric shape, a material composition, or a curvature of the initial substrate. The program can compare the material characteristics of the initial substrate to the corresponding material characteristics of the target substrate and determine the ability of initial substrate to resist stretching or elongation. A threshold value for the tensile test can be established by the program to independently measure tensile strength, compressive strength, yield strength, and shear strength. For instance, the program can determine that the initial substrate is primarily comprised of pure silica (i.e., glass), which has an ultimate tensile strength of 33 MPa. Accordingly, the program can identify one or more regions of the initial substrate that are most susceptible to stretching based upon the tensile strength of the initial substrate. The program can determine that the shaping operation will cause the identified regions of the initial substrate 200 to stretch if the shaping operation exceeds the threshold tensile strength value.

In some embodiments, the program can be configured to determine the material properties of the initial substrate 200 in determining the amount of additional non-deformable material to be added to the identified points and regions. In some examples, the material properties can refer to a material composition or a percentage of material in the initial substrate 200 and/or the target substrate. For example, the initial substrate 200 can include one or more different types of substances such as silicon dioxide ($SiO_2$), sodium oxide ($Na_2O$), sodium carbonate ($Na_2CO_3$), and calcium oxide (CaO). Each of these different types of substances can be characterized as having different crystalline structures. As a result, each type of substance can be characterized as having unique tensile, compressive, shear, bending, stretching, or torsion properties which can affect the amount of stretch that is exhibited by the initial substrate during the shaping operation.

Subsequent to the shaping operation, the shaped substrate 230 can have a uniform thickness. In some examples, the thickness of the shaped substrate 230 can be less than the thickness of the initial substrate 200. For example, due to stretching of the initial substrate 200, there can be a corresponding reduction in the thickness of the shaped substrate 230. In some examples, the initial substrate 200 can have a thickness of e.g., 50 micrometers, while the shaped substrate 230 can have a thickness of e.g., 45 micrometers. Although in some examples, the shaped substrate 230 can also have a thickness greater than the initial substrate 200. For example, the amount of additional substrate material 206 provided to the identified regions 202 can exceed the amount by which the thickness of the initial substrate 200 is expected to be reduced. In one example, the initial substrate 200 can have a thickness of e.g., 50 micrometers, while the shaped substrate 230 can have a thickness of at least e.g., 51 micrometers.

Figure 2B:
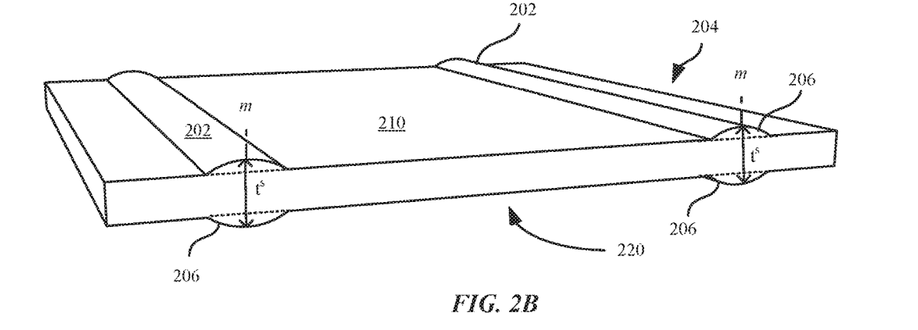

Upon identifying the regions 202 of the initial substrate 200 susceptible to stretching and/or determining the relative amount of additional substrate material 206 to be added to the identified regions 202, the additional substrate material 206 can be stacked onto the surface(s) of the identified regions 202 of the initial substrate 200. FIG. 2B shows that additional substrate material 206 is applied to the identified regions 202 on both an upper surface 210 and a lower surface 220 of the initial substrate 200 to form a compensated substrate 204, in accordance with some embodiments. Applying the additional substrate material 206 in a semi-cylindrical form can facilitate the additional substrate material 206 to uniformly fuse with the identified region 202 during the shaping operation. In some embodiments, each identified region 202 can have a midpoint (m). In some embodiments, the midpoint (m) can refer to a portion of the identified region 202 that is most susceptible to undergo stretching during the shaping operation. In some embodiments, the midpoint (m) can refer to a portion of the identified region 202 which will experience the greatest amount of reduction in thickness. FIG. 2B shows that an arc of the additional substrate material 206 is aligned with the midpoint (m) of the identified region 202 such that when the material of the compensated substrate 204 is heated and transitions from a non-deformable state to a deformable state, the additional substrate material 206 can be uniformly distributed about the midpoint (m).

Although FIG. 2B shows that the additional substrate material 206 is applied in a curved or substantially semi-cylindrical shape, other shapes are contemplated. The additional substrate material 206 can be added to the initial substrate 300 in substantially rectangular, substantially triangular, or other polygonal shapes.

Although FIG. 2B shows that the additional substrate material 206 is added to both the upper surface 210 and lower surface 220 of the initial substrate 200, the additional substrate material 206 can be added to only a single surface of the initial substrate 200. In some embodiments, providing additional substrate material 206 to both the upper surface 210 and lower surface 220 can be more compatible in specific shaping operations, such as a externally applied force operation (see FIGS. 4A-4B), where a first mold 402 and a second mold 412 are applied against the upper surface and lower surface of the compensated substrate 204. In some embodiments, providing additional substrate material 206 to only a single surface (e.g., lower surface 220) of the compensated substrate 204 can be more compatible in shaping operations (e.g., gravity pull operation) where only the single surface of the compensated substrate 204 is in contact with the mold.

In some embodiments, the additional substrate material 206 can be added to the identified regions 202 of the surface(s) of the compensated substrate 204 via a stacking process or by layering different sheets of substrate materials together.

In some embodiments, the software can establish a threshold that refers to the relative maximum amount of additional substrate material 206 which can be added to the initial substrate 200. In some embodiments, exceeding the threshold amount can impart the shaped substrate 230 with a non-uniform thickness subsequent to the shaping operation. In some embodiments, the software can establish a definitive amount of additional substrate material 206 to be added to the identified regions 202 of the initial substrate 200. Failing to provide the relative amount can impart the shaped substrate 230 with a non-uniform thickness subsequent to the shaping operation.

In some embodiments, the additional substrate material 206 can have a material composition similar or identical to the material composition of the initial substrate 200. In some examples, the initial substrate 200 can include pure silica (silicon dioxide) otherwise known as quartz glass. Additional materials of the initial substrate 300 can include silicon dioxide ($SiO_2$), sodium oxide ($Na_2O$), sodium carbonate ($Na_2CO_3$), calcium oxide (CaO), and other additives commonly used in the production of glass-like substances. In some examples, the material of the initial substrate 200 can constitute quartz glass. Although in some embodiments, the additional substrate material 206 can be a material composition dissimilar to the initial substrate 200.

In some embodiments, the composition of the additional substrate material 206 and the material composition of the initial substrate 200 can have a similar or identical coefficient of expansion. The coefficient of expansion can refer to the change in length or area of a material per unit of length or unit of area that is accompanied by a change in temperature. Materials that have a similar or identical coefficient of expansion can facilitate uniform deformation during the heating process, as well as uniform solidifying during the cooling process. Although in some embodiments, the additional substrate material 206 can have a coefficient of expansion that is not identical to the initial substrate 200.

Figure 2C:
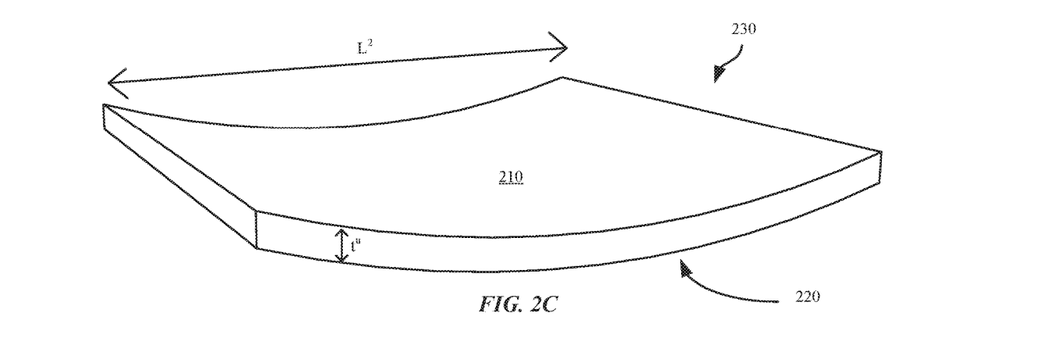

FIG. 2C shows a shaped substrate 230. The shaped substrate 230 can have an upper surface 210 and a lower surface 220. The shaped substrate 230 can be characterized as having a substantially uniform thickness ($t''$). FIG. 2C further shows that the shaped substrate 230 has a three-dimensional curvature, which can be imparted by molding surfaces.

The shaped substrate 230 can be formed by heating the compensated substrate 204 until the material of the compensated substrate 204 reaches a transition temperature. At the transition temperature, the materials of the compensated substrate 204 can transition from a non-deformable state to a deformable state. At the deformable state, the materials of the compensated substrate 204 soften to such extent that the materials can conform more easily to a molding surface. However, the materials of the compensated substrate 204 do not melt upon reaching the transition temperature. Accordingly, the additional substrate material 206, which is added to the identified regions 202, can remain at its stacked location (i.e., the deformed additional substrate material 206 does not disperse or fuse to other regions besides the identified regions 202).

When the compensated substrate 204 reaches the transition temperature, the materials of the initial substrate 200 and the additional substrate material 206 can deform. When the deformable materials of the compensated substrate 204 are placed against a molding surface, the additional substrate material 206 can disperse with the identified region 202 of the compensated substrate 204. In some embodiments, the additional substrate material 206 can fuse or become chemically bonded with the material of the identified region 202 during the shaping operation. Subsequently, applying any of force, pressure, vacuum pressure, or gravity in a shaping operation can cause the one or more surfaces of the compensated substrate 204 to conform to one or more molding surfaces. Details of the shaping operation will be described in further detail with reference to FIGS. 3-7.

The term transition temperature can refer to the glass-liquid transition where an amorphous solid can transition from a hard and "glassy" state into a soft or rubber-like state. The transition temperature refers to a range of temperature at which a material transitions between the hard-like state and the rubber-like state. The transition temperature can also be related to the amount of energy that is required in order to break covalent bonds in an amorphous (or random network) lattice of covalent bonds, and subsequently reform the broken covalent bonds. At the transition temperature, the material is heated above its recrystallization temperature. Heating the material above its recrystallization temperature can prevent the chemical bonds from re-forming with each other.

In some examples, the transition temperature of fused quartz (pure $SiO_2$) is about 1665° C. or about 1475° K.

When the molted silicon dioxide $SiO_2$ is rapidly cooled, the substrate does not crystallize, but instead solidifies as an amorphous (non-crystalline) glass structure.

The process of heating the materials of the compensated substrate 204 to a transition temperature such that the materials deform, and subsequently cooling the materials can be referred to as an annealing process. Annealing can result in altering the physical and chemical properties of the materials of the compensated substrate 204 so as to increase ductility such that the compensated substrate 204 becomes more moldable. Annealing can also reduce or relieve internal stresses introduced by shaping the compensated substrate 204. Bending the compensated substrate 204 so as to form a curvature can cause internal stress, while the annealing process can reduce the amount of internal stress within the glass.

In some embodiments, the additional substrate material 206 can chemically bond with the materials sourced from the initial substrate 200 subsequent to a fusion process. In some examples, fusion of the materials of the compensated substrate 204 is accompanied by heating the compensated substrate 204 to a transition temperature. In some embodiments, chemically bonding the additional substrate materials 206 to the materials (from the initial substrate 200) at the identified regions 202 can cause the identified regions 202 to become denser. Density can refer to either a mass or an amount of atoms that occupy a given unit of space (e.g., volume). Accordingly, the identified regions 202 can become denser than other regions of the compensated substrate 204. In some embodiments, the bonding of different materials does not affect the density of the identified region 202. In other words, the density of the identified regions 202 is not substantially different than the density of other regions of the compensated substrate 204.

FIG. 2C shows that the shaped substrate 230 has a three-dimensional curvature having a uniform thickness ($t''$). The three-dimensional curvature of the shaped substrate 230 can substantially conform to the molding surface. The shaped substrate can have a final length ($L^2$), which can be longer than the initial length ($L^1$) associated the initial substrate 200. The stretching of the compensated substrate 204 to form a shaped substrate 230 can result in a larger surface area; thus, increasing the length of the shaped substrate 230.

Figure 2D:
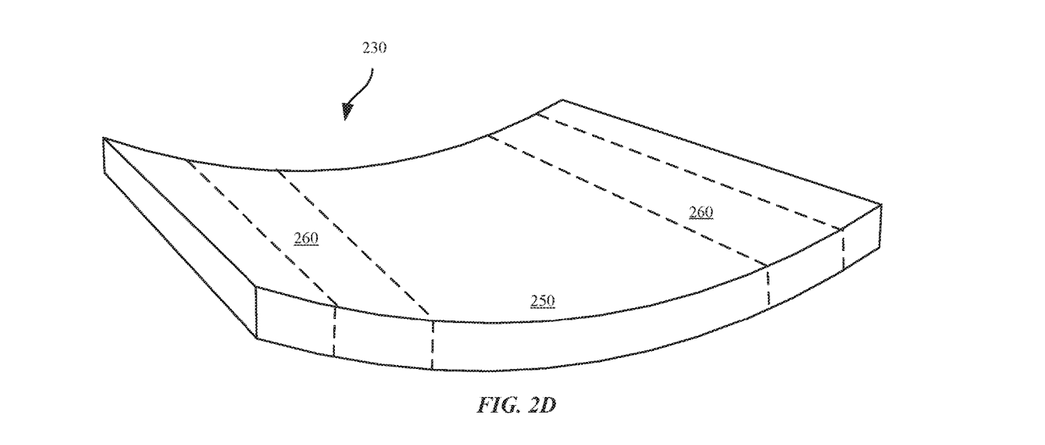

In some embodiments, a chemical analysis can be performed on the shaped substrate 230 to identify regions 250 associated with the initial substrate 200 and those regions 260 where additional substrate material 206 was added, as shown in FIG. 2D. In some embodiments, a spectrophotometry analysis can be used to differentiate regions 250 associated with the initial substrate 200 from regions 260 associated with the additional substrate material 260. Spectrophotometry refers to quantitative measurement of the reflection or light transmission properties of a material as a function of wavelength. In some embodiments, the regions 260 associated with the additional substrate material 206 can be determined to be more dense than regions 250 associated with the initial substrate 200. In some embodiments, the regions 260 associated with the additional substrate material 206 can be determined to be less dense than regions 250 associated with the initial substrate 200. Accordingly, in some examples, the amount of light transmitted through these regions 250, 260 can show substantial differences in light differentiation. Other parameters of the compensated substrate 204 which can be measured include the amount of light reflected through the materials of the regions 250, 260. Based upon the amount of light that is transmitted or reflected through regions 250, 260, a computing device (see ref. 800, FIG. 8) can identify regions 250 associated with the initial substrate 200 and those regions 260 where additional substrate material 206 was added.

Figure 3A:
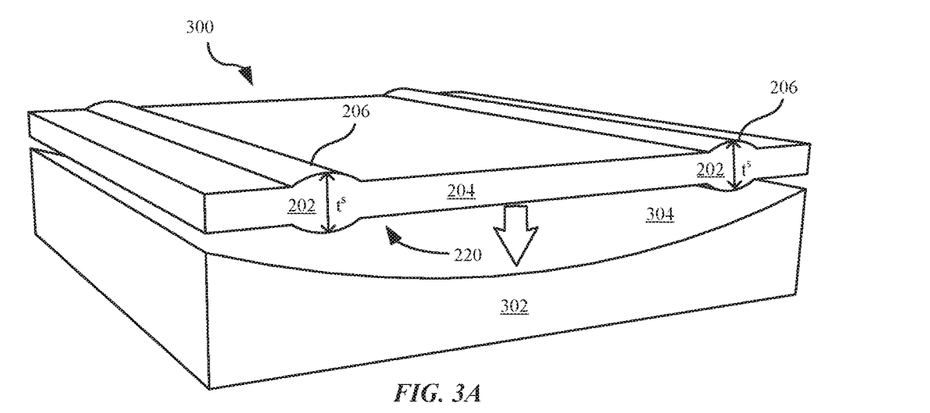
FIGS. 3A-3C illustrate a shaping operation that relies upon gravity, in accordance with some embodiments.
Figure 3B:
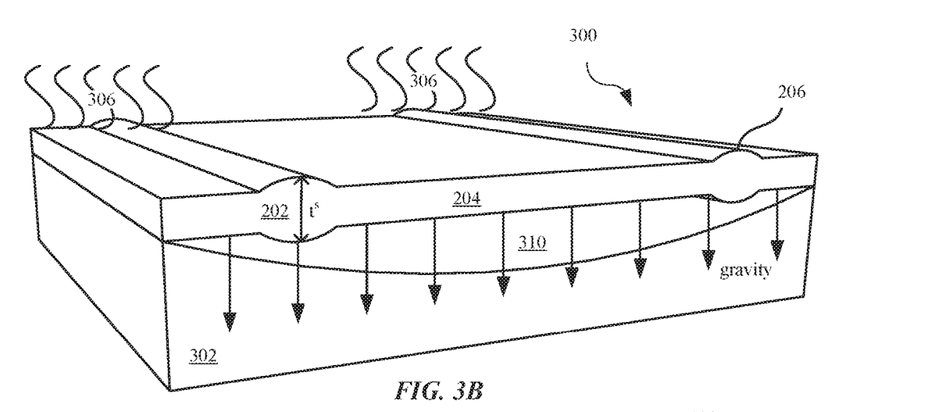
Figure 3C:
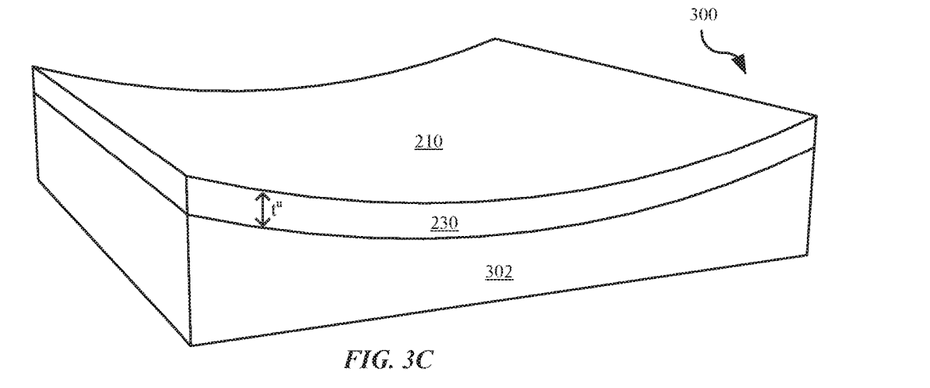

FIGS. 3A-3C illustrates various perspective views of an apparatus and techniques for shaping a compensated substrate 204 according to a gravity pull molding operation 300, in accordance with some embodiments. FIG. 3A shows that the apparatus for the operation 300 can include a mold 302 having a molding surface 304 that has a shape and size that corresponds to the three-dimensional curvature of a target substrate. The molding surface 304 can impart a curvature on the compensated substrate 204 when the lower surface 220 of the compensated substrate 204 is physically applied against the molding surface 304. The mold 302 can have a generally concave upper surface 304 in some embodiments. In some embodiments the mold 302 can include a generally convex upper surface 304. FIG. 3A illustrates that the compensated substrate 204 is positioned over the molding surface 304 of the mold 302. FIG. 3A shows that the compensated substrate 204 can have a compensated substrate thickness ($t^c$) where material of the identified region 202 that includes the additional substrate material 206 can have a thickness greater than other regions of the compensated substrate 204.

In some embodiments, the compensated substrate 204 can be cut to match the dimensions of the mold 302. For example, the length of the compensated substrate 204 can be cut slightly longer than the length of the molding surface 304 in order to compensate for any shrinkage in the material of the compensated substrate 204 when it is deformed.

Once the compensated substrate 204 is placed into the mold 302, a heater (not illustrated) can direct thermal energy (e.g., heat) 306 towards the compensated substrate 204. The heat can raise the temperature of the compensated substrate 204 such that the compensated substrate 204 is able to reach a transition temperature, as shown in FIG. 3B.

FIG. 3B illustrates using a gravity force or "slumping" operation to apply a curvature to the compensated substrate 204, in some embodiments. Slumping can refer to a controlled or uncontrolled operation whereby the compensated substrate 204 is slumped or sinks into a cavity 310 formed by the upper surface 304 of the mold 302. Both the compensated substrate 204 and the mold 302 can be placed into a heated kiln or furnace. In addition, one or more additives can be applied to the molding surface 304 of the mold 302. The additives can refer to releasing agents, which can facilitate as a frictionless or non-stick coating. When heat 306 is applied, the temperature of the materials of the compensated substrate 204 can rise to a transition temperature, at which point the materials transition from a non-deformable state to a deformable state. Upon the materials of the compensated substrate 204 becoming deformable, gravity can act upon the deformable material and cause the deformable material to slump into the cavity 310 formed by the molding surface 304 of the mold 302. Accordingly, the deformable material of the compensated substrate 204 can substantially conform to the molding surface 304 of the mold 302. While the compensated substrate 204 is in the deformable state, the temperature of the heater can be held at a constant temperature (i.e., within the transition temperature).

FIG. 3C shows a shaped substrate 230 subsequent to the shaping operation. FIG. 3C shows that the additional substrate material 206 has fused with the identified regions 202 of the compensated substrate 204. The shaped substrate 230 can have a substantially uniform thickness ($t^u$). Once the shaped substrate 230 adopts the shape and geometry of the molding surface 304 of the mold 302, the temperature of the shaped substrate 230 can be lowered so as to harden the shaped substrate 230. This phase of transitioning the compensated substrate 204 from a viscous liquid into a glass state can be referred to as a vitrification process.

Figure 4A:
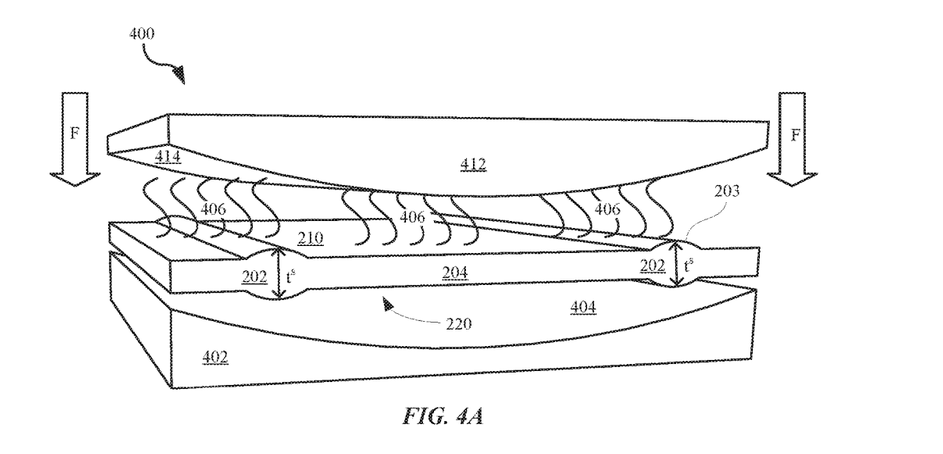
FIGS. 4A-4B illustrate a shaping operation that relies upon applying force, in accordance with some embodiments.
Figure 4B:
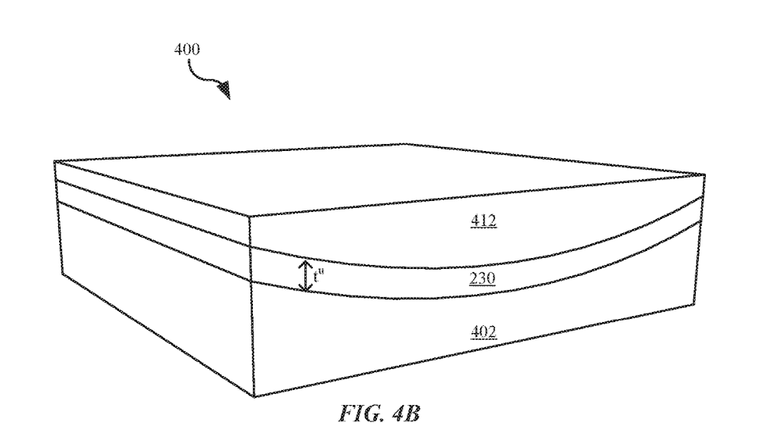

FIGS. 4A-4B illustrates various perspective views for shaping a compensated substrate 204 according to a pressed molding operation 400, in accordance with some embodiments. FIG. 4A shows that the apparatus for the pressed molding operation 400 can include a first mold 402 and a second mold 412. The first mold 402 can include a molding surface 404. The second mold 412 can include a molding surface 414. The molds 402, 412 can have molding surfaces 404, 414 that can impart the compensated substrate 204 to substantially conform to the three-dimensional curvature of a target substrate. The molding surfaces 404, 414 can impart a curvature on both the lower surface 220 and the upper surface 210 of the compensated substrate 204 via a molding operation. The molding surface 404 of the mold 402 can have a generally concave surface. The molding surface 414 of the mold 412 can have a generally convex surface.

In some embodiments, the compensated substrate 204 can be cut to match the dimensions of the molds 402, 412. For example, the length of the compensated substrate 204 can be cut slightly longer than the length of the molding surface 404 in order to compensate for any shrinkage in the material of the compensated substrate 204 when it is deformed.

FIG. 4A illustrates using a pressed molding operation 400 to apply a curvature to the compensated substrate 204, in accordance with some embodiments. Pressed molding can refer to physically applying force to the compensated substrate 204 when the materials of the compensated substrate 204 are sufficiently deformed. Both the compensated substrate 204 and the molds 402, 412 can be placed into a heated kiln or furnace. In addition, one or more additives can be applied to the molding surfaces 404, 414 of the molds 402, 412. The additives can refer to releasing agents, which can facilitate as a frictionless or non-stick coating. FIG. 4A shows that the compensated substrate 204 can have a compensated substrate thickness ($t^c$) where material of the identified region 202 that includes the additional substrate material 206 can have a thickness greater than other regions of the compensated substrate 204.

When heat 406 is applied, the temperature of the material of the compensated substrate 204 can rise to a transition temperature, at which point the material of the compensated substrate 204 can become deformable. When the compensated substrate 204 becomes deformed, force (F) can be applied by the mold 412 against the upper surface 210 of the compensated substrate 204. In some embodiments, applying force (F) by the mold 412 against the upper surface 210 of the compensated substrate can push the compensated substrate 204 towards the mold 402. As a result, the molding surfaces 404, 414 of the molds 402, 412 can form a tight seal with the upper and lower surfaces 210, 220 of the compensated substrate 204.

The force (F) applied to the compensated substrate 204 can be the value of pressure P times area A of surface of compensated substrate 204 (i.e., F=P×A).

During the deformable state, the additional substrate material 206 can fuse with the material of the identified regions 202. Once the shaped substrate 230 conforms to a shape, curvature, and size of a target substrate, the shaped substrate 230 can be cooled. FIG. 4B shows that the shaped substrate 230 can have a substantially uniform thickness ($t^u$).

Figure 5A:
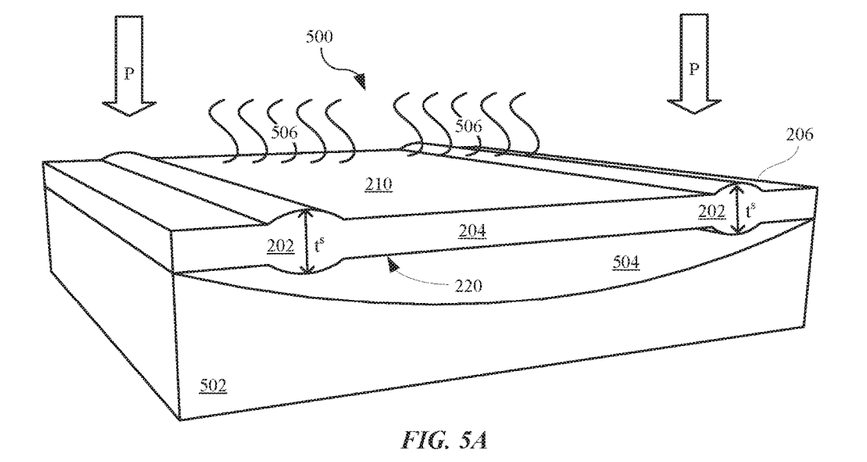
FIGS. 5A-5B illustrate a shaping operation that relies upon applying pressurized gas, in accordance with some embodiments.
Figure 5B:
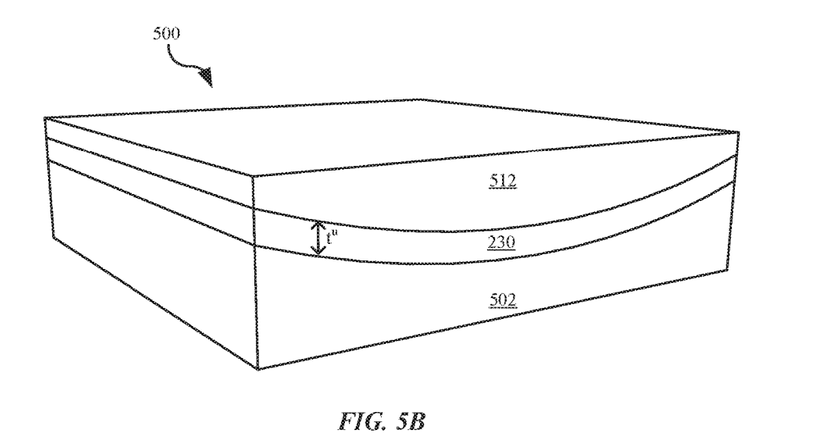

FIGS. 5A-5B illustrate a perspective view for shaping a compensated substrate 204 according to a compression molding operation 500, in accordance with some embodiments. FIG. 5A shows that the apparatus for the compression molding operation 500 includes a mold 502. Both the compensated substrate 204 and the mold 502 can be placed into a heated kiln or furnace. In addition, one or more additives (not illustrated) can be applied to a molding surface 504 of the mold 502. The additives can refer to releasing agents, which can facilitate as a frictionless or non-stick coating. FIG. 5A shows that the compensated substrate 204 can have a compensated substrate thickness ($t^s$), where the combination of material of the identified region 202 and the additional substrate material 206 can have a thickness greater than other regions of the compensated substrate 204.

Heat 506 can be applied to the compensated substrate 204, which can raise the temperature of the materials of the compensated substrate 204. When the compensated substrate 204 reaches a transition temperature, the materials of the compensated substrate 204 can become sufficiently deformable to undergo a change in shape and size. When the materials of the compensated substrate 204 become deformable, pressure (P) can be applied against the upper surface 210 of the compensated substrate 204 to push the compensated substrate 204 against the molding surface 504 of the mold 502. The pressure (P) applied against the compensated substrate 204 can compel the compensated substrate 204 to form a tight seal with the molding surface 504 of the mold 502. In some embodiments, pressure (P) and heat can be maintained until the shape of the compensated substrate 204 has sufficiently conformed to the shape and size of the molding surface 504 of the mold 502. By pushing the compensated substrate 204 against the mold 502, the surface of the shaped substrate 230 can be imparted with a curvature, which substantially conforms to the molding surface 504.

The pressure system can be used to apply pressure from a gas source directly to the compensated substrate 204. In this way, pressure P applied to compensated substrate 204 can be simply the value of force F divided by area A of surface of compensated substrate 204 (i.e., P=F/A).

During the deformable state, the additional substrate material 206 can fuse with the material of the identified regions 202. During the deformable state, the lower surface 220 of the compensated substrate 204 can substantially conform to the shape and size of the molding surface 504 of the mold 502 to form a shaped substrate 230, as shown in FIG. 5B. Once the shaped substrate 230 conforms to a shape, curvature, and size of a target substrate, the shaped substrate 230 can be cooled. FIG. 5B shows that the shaped substrate 230 can have a substantially uniform thickness ($t^u$).

Figure 6A:
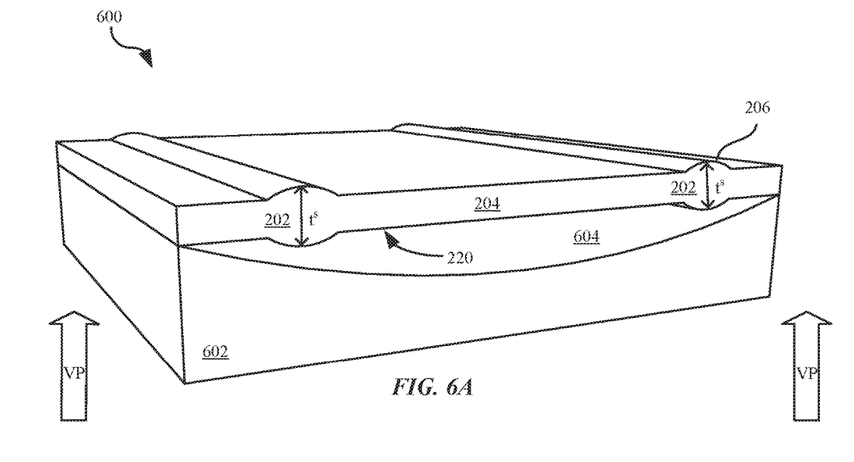
FIGS. 6A-6B illustrate a shaping operation that relies upon applying a vacuum, in accordance with some embodiments.
Figure 6B:
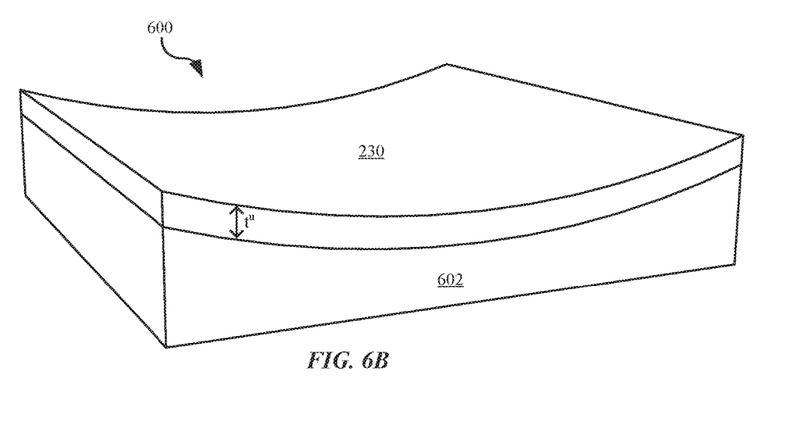

FIGS. 6A-6B illustrate a perspective view for shaping a compensated substrate 204 according to a vacuum molding operation 600, in accordance with some embodiments. FIG. 6A shows that the apparatus for the vacuum molding operation 600 includes a mold 602. Both the compensated substrate 204 and the mold 602 can be placed into a heated kiln or furnace. In addition, one or more additives (not illustrated) can be applied to the molding surface 604 of the mold 602.

When heat is applied to the compensated substrate 204, the temperature of the materials of the compensated substrate 204 can rise. At a transition temperature, the materials of the compensated substrate 204 reach a deformable state. When the compensated substrate 204 becomes deformable upon reaching the transition temperature, a vacuum pressure (VP) can be supplied by a vacuum pressure source (not illustrated) to pull the lower surface 220 of the compensated substrate 204 towards the molding surface 604 of the mold 602. The vacuum pressure (VP) can refer to a negative amount of pressure between the mold 602 and the compensated substrate 204, which is less than the atmospheric pressure. In some examples, the vacuum pressure (VP) can be an atmospheric pressure that is less than sea level. The vacuum pressure (VP) can remove air trapped between the compensated substrate 204 and the molding surface 604 of the mold 602. In some examples, the vacuum pressure can be between e.g., about 13 pounds per square inch (PSI) and about 15 PSI. In some examples, the vacuum pressure (VP) can be characterized as having a sucking motion. The vacuum pressure (VP) can also hold the compensated substrate 204 in position relative to the molding surface 604. FIG. 6A shows that the compensated substrate 204 can have a compensated substrate thickness ($t^s$), where the combined material of the identified region 202 and the additional substrate material 206 can have a thickness greater than other regions of the compensated substrate 204.

During the deformable state, the additional substrate material 206 can fuse with the material of the identified regions 202. During the deformable state, the lower surface 220 of the compensated substrate 204 can substantially conform to the shape and size of the molding surface 604 of the mold 602 to form a shaped substrate 230, as shown in FIG. 6B. Once the shaped substrate 230 conforms to a shape, curvature, and size of a target substrate, the shaped substrate 230 can be cooled. FIG. 6B shows that the shaped substrate 230 can have a substantially uniform thickness ($t^u$).

Figure 7:
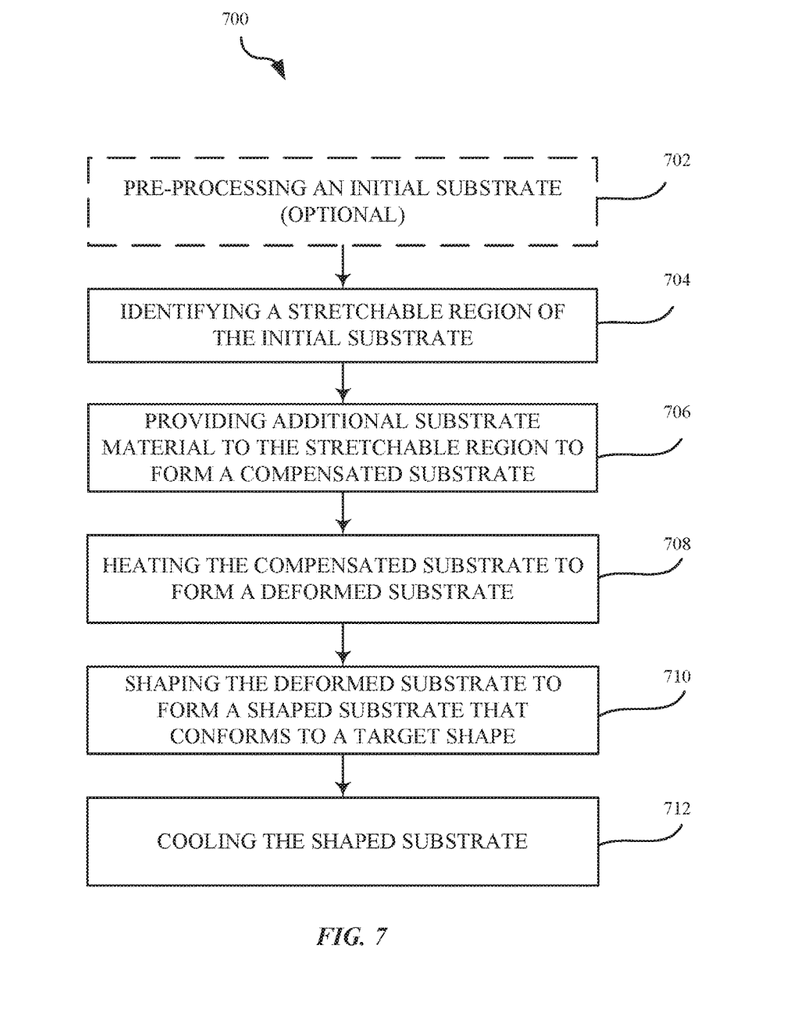
FIG. 7 illustrates a flowchart detailing a process for forming a substrate having a three-dimensional curvature, in accordance with some embodiments.

FIG. 7 illustrates a method 700 for forming a glass substrate having a three-dimensional curvature according to some embodiments. As shown in FIG. 7, the method 700 can begin at step 702, where a pre-processing operation can be optionally performed on an initial substrate. The pre-processing operation can include polishing the initial substrate. Polishing an initial substrate having a flat geometry or planar surface can be less complex than polishing a curved initial substrate. The surface treatment can involve a polishing process that creates a mirror-like finish on the surface of the initial substrate. In some embodiments, polishing processes can include chemical polishing, which involves exposing the metal substrate to acidic solution, e.g., sulfuric acid and phosphoric acid solutions. In some embodiments, the polishing process can include one or more mechanical polishing processes.

At step 704, regions of the initial substrate that are susceptible to stretching can be identified. Stretchable regions can be identified by comparing the geometry, shape, and/or size of the initial substrate to corresponding regions of a target substrate. An amount of additional substrate material can be added to the stretchable regions of the initial substrate to form a compensated substrate at step 706.

At step 708, the compensated substrate can be heated to form a deformed substrate. Upon reaching a transition temperature, the materials of the compensated substrate can transition from a non-deformable state to a deformable state. Upon reaching the deformable state, the one or more surfaces of the compensated substrate can be molded to substantially conform to one or more molding surfaces. The compensated substrate can be shaped (e.g., molded) to form a shaped substrate, where the shaped substrate can substantially conform to a target substrate at step 710. In addition, the shaped substrate can have a uniform thickness.

At step 712, the shaped substrate is cooled. Cooling the shaped substrate: can complete an annealing process, which can reduce the amount of residual internal stress introduced during the shaping operation.

Although embodiments for forming the glass substrate having a three-dimensional curvature are generally described by techniques that include adding additional substrate material to the stretchable regions of the initial substrate and heating the compensated substrate to form a shaped substrate, other embodiments for forming the shaped substrate may not require steps that involve adding additional substrate material and/or a shaping operation. For example, some embodiments for forming the shaped substrate from an initial substrate may bypass the steps of identifying regions of the initial substrate that are susceptible to stretching by operating on an initial substrate that already includes the additional substrate material. In this manner, the subsequent steps can simply involve shaping the initial substrate (e.g., via molding operation), and subsequently machining any excess substrate material in order to substantially conform the initial substrate to a shape and a size of a target substrate.

In other embodiments, the initial substrate is machined in order to remove existing substrate material from the initial substrate to form the shaped substrate. In some examples, the shape and size of the initial substrate would more closely conform to the shape and size of the target substrate in contrast to other embodiments where the initial substrate does not conform to the shape and size of the target substrate and additional substrate material is added to the initial substrate. In other words, because the initial substrate closely conforms to the shape and size of the target substrate, the initial substrate can simply be machined to remove excess substrate material. In this manner, the shaping operation (e.g., via molding operation) is entirely bypassed.

Figure 8:
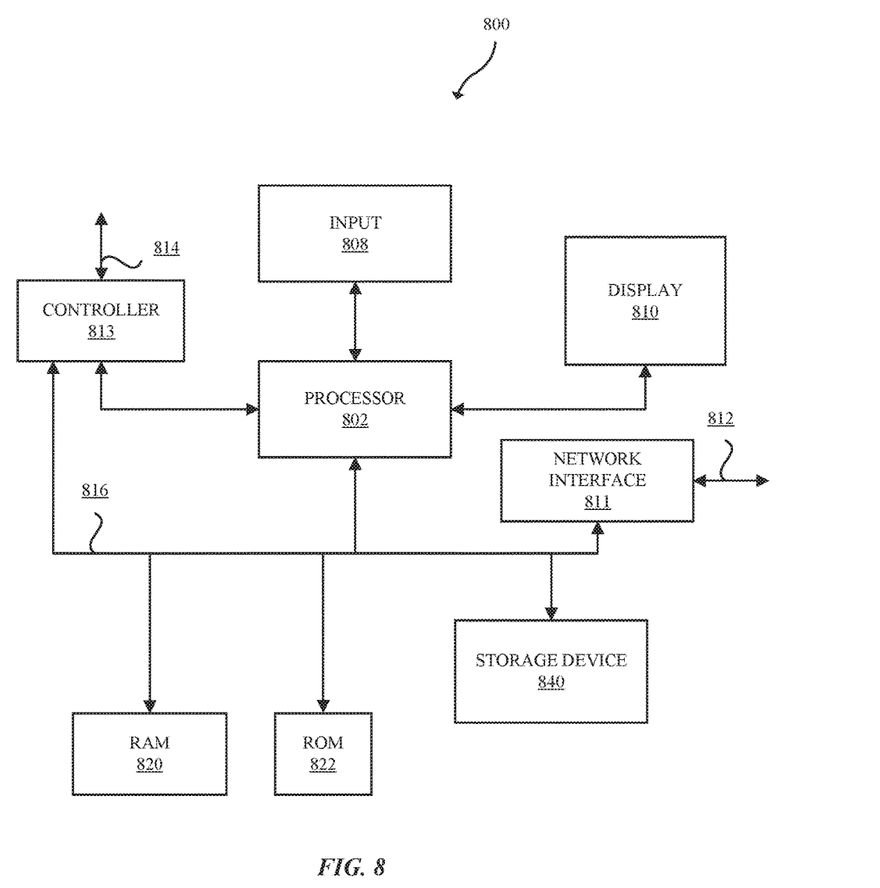
FIG. 8 illustrates a detailed view of a computing device that can be used to identify and modify a stretchable region of a substrate, according to some embodiments.

FIG. 8 illustrates a detailed view of a computing device 800 that can be used to implement the various components described herein, according to some embodiments. In particular, the detailed view illustrates various components that can be included in the computing device 800 that executes instructions for identifying a stretchable region of the initial substrate and determining the amount of additional substrate material to be added to the stretchable region.

As shown in FIG. 8, the computing device 800 can include a processor 802 that represents a microprocessor or controller 813 for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 (screen display) that can be controlled by the processor 802 to display information to the user. A data bus 816 can facilitate data transfer between at least a storage device 840, the processor 802, and a controller 813. The controller 813 can be used to interface with and control different equipment through equipment control bus 814. The computing device 800 can also include a network/bus interface 811 that couples to a data link 812. In the case of a wireless connection, the network/bus interface 811 can include a wireless transceiver.

The computing device 800 also include a storage device 840, which can comprise a single disk or multiple disks (e.g., hard drives), and includes a storage management module that manages one or more partitions within the storage device 840. In some embodiments, the storage device 840 can include flash memory, semiconductor (solid state) memory or the like. The computing device 800 can also include a Random Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for producing a curved part formed of a glass material comprising:
   using a computing system comprising a processor and memory:
   comparing a shape of a model of a precursor part to a shape of a model of a curved target part; and
   based at least in part on the operation of comparing, identifying a region of the precursor part corresponding to a region of a model of a curved part predicted to deviate from a target thickness as a result of a shaping process, thereby establishing a predicted thickness deviation;
   altering a geometry of the region of the precursor part in a manner that compensates for the predicted thickness deviation, thereby forming a compensated precursor part; and
   shaping the compensated precursor part in a mold, thereby forming the curved part having the target thickness and a curved shape corresponding to a shape of the curved target part.

2. The method of claim 1, wherein the region of the precursor part is predicted to have a thickness less than the target thickness as the result of the shaping process.

3. The method of claim 2, wherein the operation of altering the geometry of the region of the precursor part comprises adding an amount of the glass material to the region of the precursor part.

4. The method of claim 3, wherein the amount of the glass material added to the region of the precursor part has a transition in thickness.

5. The method of claim 3, wherein the operation of altering the geometry comprises removal of a portion of the region of the precursor part.

6. The method of claim 3, wherein the operation of shaping the compensated precursor part comprises:
   heating the compensated precursor part to a temperature above a glass transition temperature and below a melting temperature of the glass material; and
   applying the mold against a surface of the compensated precursor part, the mold having a molding surface configured to produce the shape of the curved target part.

7. The method of claim 6, further comprising cooling the curved part below the glass transition temperature.

8. A method for forming a curved part comprising:
receiving, at a computing system comprising a processor and memory, a shape and a size of a region of a planar precursor substrate comprising a glass material;
predicting a shape and a size of a first corresponding region of a model of a curved part resulting from a shaping process;
comparing the shape and the size of the first corresponding region of the model of the curved part to a shape and a size of a second corresponding region of a curved target part;
identifying the region of the planar precursor substrate as susceptible to stretching when the comparing indicates that a difference between the shape and the size of the first corresponding region and the shape and the size of the second corresponding region satisfies a condition;
determining an amount of the glass material to be added to the region of the planar precursor substrate;
adding the amount of the glass material to the region of the planar precursor substrate to form a compensated precursor substrate; and
shaping the compensated precursor substrate in a mold, while heating the compensated precursor substrate, to form the curved part having one or more surfaces corresponding to one or more surfaces of the curved target part.

9. The method of claim 8, further comprising receiving, at the computing system, a material composition of the planar precursor substrate.

10. The method of claim 8, wherein:
the region of the planar precursor substrate comprises a midpoint; and
the amount of the glass material is uniformly distributed about the midpoint.

11. The method of claim 10, wherein the amount of the glass material defines an arc.

12. The method of claim 8, wherein shaping the compensated precursor substrate further comprises shaping one or more surfaces of the compensated precursor substrate by applying at least one of gravity, force, or pressure to the one or more surfaces of the compensated precursor substrate.

13. The method of claim 8, wherein the curved part is characterized as having a substantially uniform thickness.

14. The method of claim 8, wherein the amount of the glass material is fused to the planar precursor substrate.

15. A method for forming a curved part comprising:
using a computing system comprising a processor and memory:
comparing a shape of a precursor part comprising a glass material to a shape of a curved target part; and
based at least in part on the operation of comparing:
identifying a region of the precursor part predicted to stretch during a shaping operation and to produce a reduced thickness region having a thickness less than a target thickness of the curved target part; and
predicting a thickness deviation between the thickness of the reduced thickness region and the target thickness; and
altering a geometry of the region of the precursor part in a manner that compensates for the predicted thickness deviation, thereby forming a compensated precursor part; and
shaping the compensated precursor part in a mold, thereby forming the curved part having the target thickness and a curved shape corresponding to the shape of the curved target part.

16. The method of claim 15, wherein the operation of altering the geometry of the region of the precursor part comprises adding an amount of the glass material to a surface of the precursor part.

17. The method of claim 16, wherein:
the amount of the glass material is a first amount of the glass material and the surface is a first surface; and
the operation of altering the geometry of the region of the precursor part further comprises adding a second amount of the glass material to a second surface of the precursor part.

18. The method of claim 17, wherein the first surface is opposite the second surface.

19. The method of claim 15, wherein:
the glass material is a first glass material; and
the operation of altering the geometry of the region of the precursor part comprises adding an amount of a second glass material having a composition different than a composition of the first glass material.

* * * * *